United States Patent [19]

Ricketts

[11] Patent Number: 5,170,750

[45] Date of Patent: Dec. 15, 1992

[54] BIRDFEEDING DEVICE

[76] Inventor: Joseph H. Ricketts, 667 Meadowbrook Ave., Ambler, Pa. 19002

[21] Appl. No.: 736,779

[22] Filed: Jul. 29, 1991

[51] Int. Cl.⁵ .......................... A01K 1/10; A01K 5/00
[52] U.S. Cl. .................................................. 119/52.3
[58] Field of Search ................ 119/51.12, 52.2, 52.3, 119/57.8, 57.9, 62; 220/264

[56] References Cited

U.S. PATENT DOCUMENTS

| | | | |
|---|---|---|---|
| 648,953 | 5/1900 | Hanson | 119/62 |
| 1,535,165 | 4/1925 | Koerperich et al. | 119/62 |
| 2,483,304 | 9/1949 | Vogel | 220/264 X |
| 3,164,130 | 1/1965 | Curtis et al. | 119/57.9 |
| 3,631,840 | 1/1972 | McCormack | 119/51.12 |
| 3,646,912 | 3/1972 | Gardner | 119/51.12 |
| 3,785,348 | 1/1974 | Polidori, Sr. et al. | 119/62 |
| 4,104,988 | 8/1978 | Trutor | 119/57.8 |
| 4,185,588 | 1/1980 | Harris | 119/51.12 |
| 4,974,547 | 12/1990 | Graham | 119/52.3 X |

Primary Examiner—John G. Weiss
Assistant Examiner—Nicholas D. Lucchesi
Attorney, Agent, or Firm—Joseph W. Molasky & Associates

[57] ABSTRACT

A birdfeeder according to the invention is designed for repelling predatory animals. The feeder includes a spring-actuated roof which acts as a catapult when an animal alights thereon. The roof is secured by a latch which disengages when spring loaded pistons urge the roof upward and it can be closed and resecured either manually or automatically by motor.

5 Claims, 3 Drawing Sheets

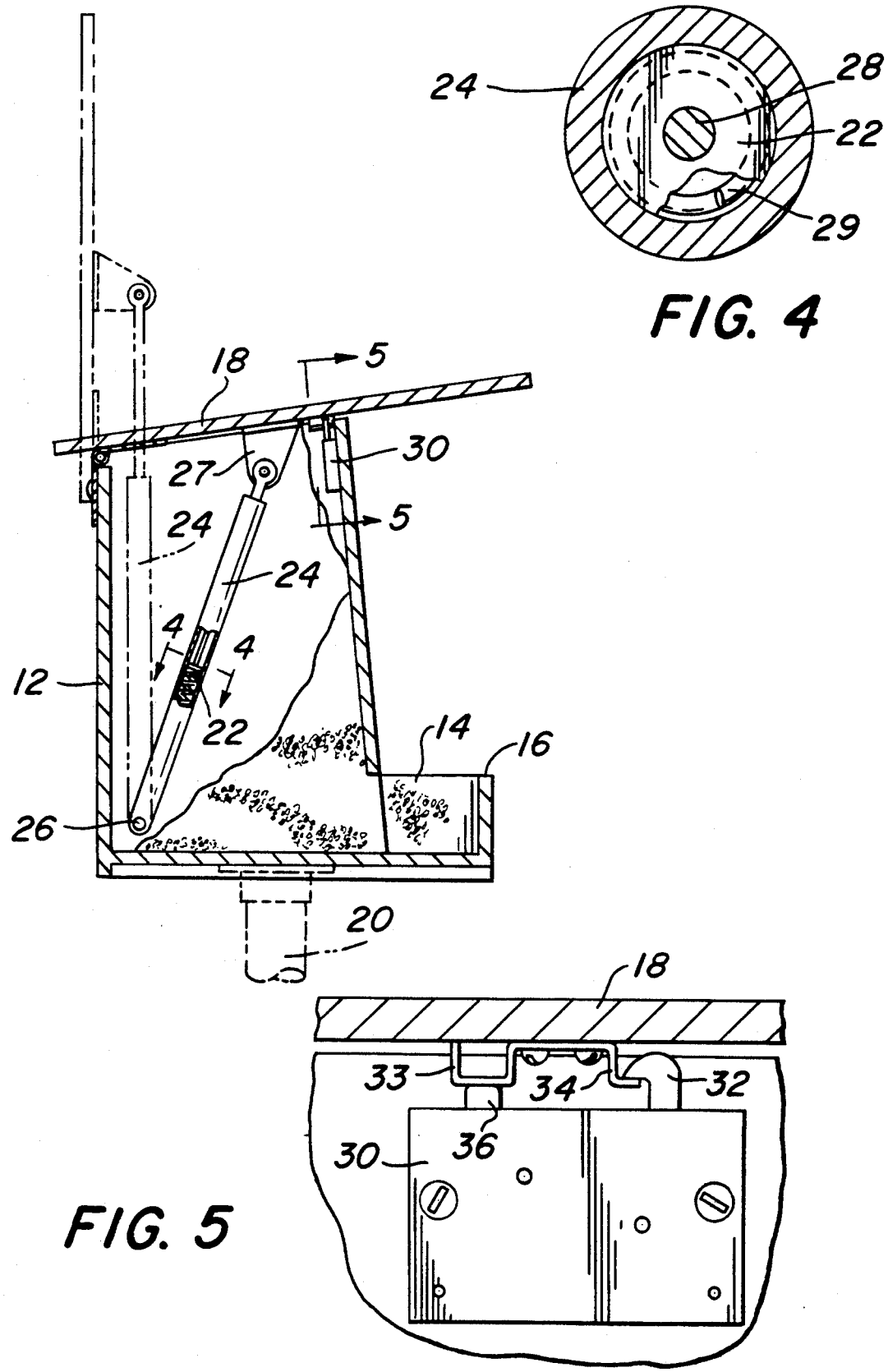

BIRDFEEDING DEVICE

Bird watching is enjoyed by people of all ages. Some view these animals in the wild while others entice them to their yards with feeders where they can be observed while they eat. Usually, these feeders are placed in a sylvan setting which replicates to some extent the habitat in which birds are usually found so as to attract a wide variety of avian species.

Unfortunately, the conditions which attract birds also attracts other wildlife. Squirrels and chipmunks, for example, are a particular problem because they compete with birds for the same food.

This is not a case of share and share alike. Squirrels and chipmunks are scavengers which hide their food and then chase away other animals because they have a keen sense of territory. Once these animals claim an area as their own they guard it zealously and they will intimidate if possible any interloper or threat to their food supply.

Squirrels and chipmunks also have in common one other characteristic which makes them anathema to bird lovers. They are playful to an extreme. Squirrels, for example, not only frolic with one another but they challenge birds in the same way and cause them to take flight. As a result, many efforts have been made to discourage squirrels and chipmunks from avian areas.

BACKGROUND

One such effort consists of a birdfeed receptacle covered with a wide mesh screen; one which allows access to birds but prevents other animals from feeding. Unfortunately, however, screens are not enough because the presence of food in any form, whether accessible or not, is an attractive nuisance which encourages animals of all kinds to compete for the food supply.

Squirrels, in particular, are so pernicious that they will attack a birdfeeder by dropping onto its roof and they do so with such suddenness and abandon that they frighten away whatever birdlife is in the area.

Accordingly, there is a need for a feed device which will provide birds with a safe haven while discouraging squirrels, chipmunks and similar animals.

SUMMARY OF THE INVENTION

This invention relates to a device which allows birds to feed while also serving as a deterrent to other predatory animals.

Specifically, this invention is a birdfeeder equipped with a spring actuated roof which snaps open and acts as a catapult when an animal lands on its surface. Once actuated, the roof may be closed again either mannually or by automated means and thus returned to its operable mode.

BRIEF DESCRIPTION OF THE DRAWINGS

FIG. 2 is a vertical cross sectional view of one embodiment of the interior of a birdfeeder of this invention.

FIG. 4 is a cross sectional view of the spring loaded cylinder shown in FIG. 2 along lines 4—4.

FIG. 5 is a side view of the latch assembly shown in FIG. 2 along lines 5—5.

DETAILED DESCRIPTION OF THE INVENTION

The birdfeeder of this invention will now be described by reference to the Drawings.

Figure 1:
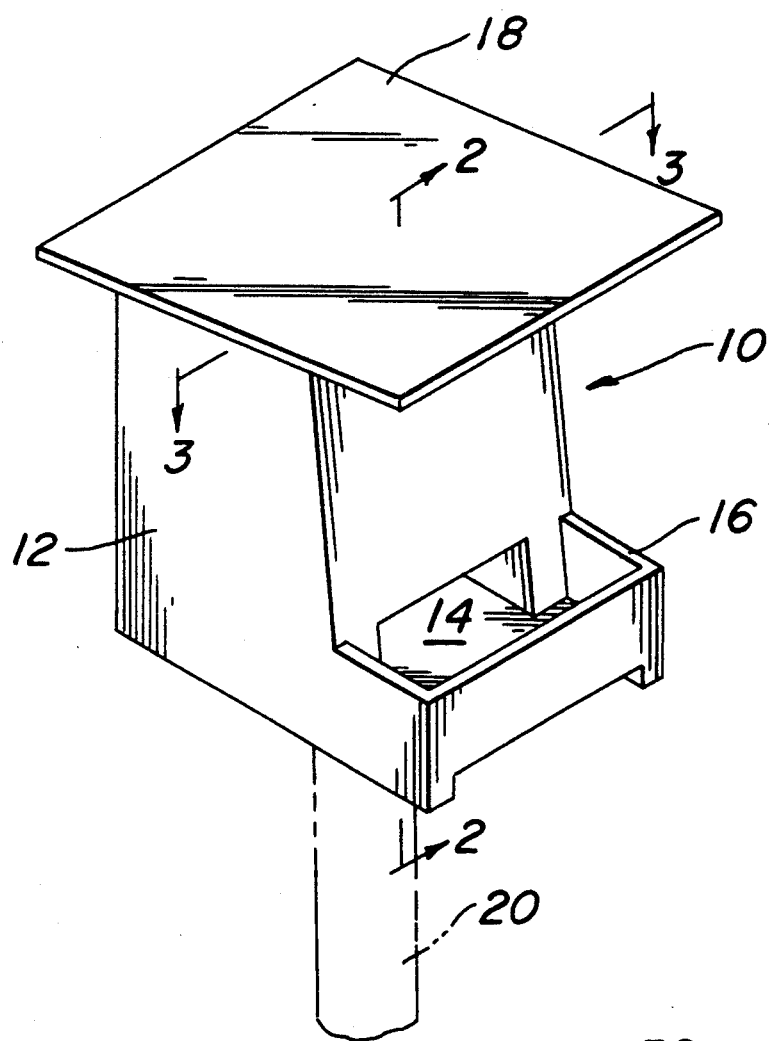
FIG. 1 is a perspective view of a birdfeeder according to this invention.

In FIG. 1 there is shown a birdfeeder 10 having a rectangular or square housing 12 for holding bird food. A feeding tray 14 extends from the housing 12 and includes a ledge 16 upon which birds can perch while feeding. The birdfeeder also has a roof 18 which is hingedly connected to the housing 12 and a pole or other support 20 that supports the housing and maintains it upright in a conventional manner.

Figure 3:
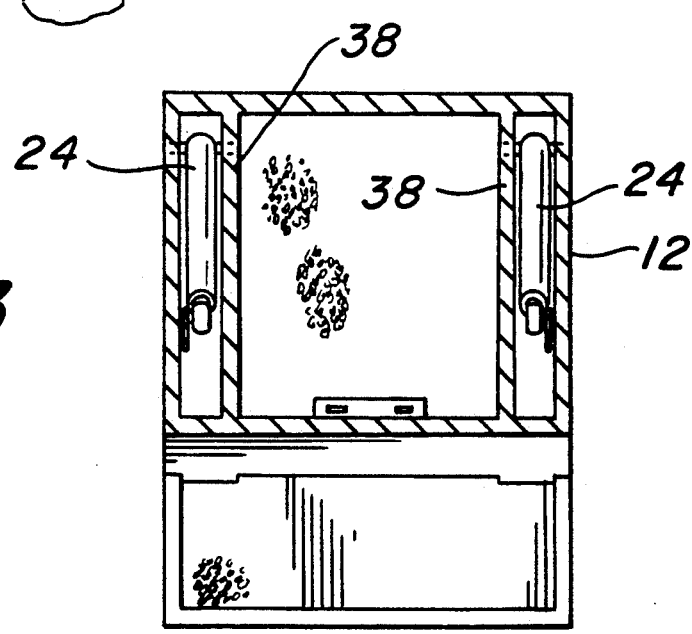
FIG. 3 is a top view of the interior of a birdfeeder of this invention.

FIG. 2 is a vertical cross sectional view of the interior of the housing 12. Two spring loaded pistons 24 are fastened to the housing 12 at one end by means of a pivotable rivet 26 and to the roof 18 by means of a fastener 27. The springs 22 are in compression when the roof 18 is closed. As can be seen in FIG. 3, the spring loaded pistons 24 are separated by a wall 38 from the remainder of the housing 12 interior to prevent the bird seed or other food from interfering with the operation of the spring loaded pistons 24. FIG. 4 is a cross sectional view of a spring loaded piston 24 taken along the lines 4—4 of FIG. 2. A central piston rod 28 is surrounded by a spring 22 maintained in compression by the piston head 29.

A latch mechanism 30 provides temporary closure of the roof 18. Suitably the latch 30 is a trip type latch, such as an Ives-type latch as shown in FIG. 5, taken along the lines 5—5 of FIG. 2 and comprising a metal piece 32 shaped in the form of a hook that can engage a catch 34. FIG. 5 illustrates the latch 30 in its closed position. This latch is readily unhooked or disengaged when the roof 18 is subjected to downward pressure as, for example, the weight of a small animal. Downward pressure on member 33 depresses a spring loaded button type extension 36. When the extension 36 is depressed the hook 32 becomes disengaged from the catch 34.

When a squirrel or other small animal lands on the roof, the weight of the animal pushes down on the roof, disengaging the hook 32, as explained above, whereupon, the roof 18 will be urged upwards by the springs 22 of the pistons 24 as they decompress. The open configuration of the roof 18 is shown in dotted lines in FIG. 2. The squirrel will then be bounced or catapulted back from whence it came, generally with no harm done to the animal, by proper tensioning of the springs 22 with respect to the roof 18.

The roof 18 is then readily relatched manually by swinging the roof 18 down to recompress the spring 22, and exerting a slight pressure to reengage the latch 30.

Figure 6:
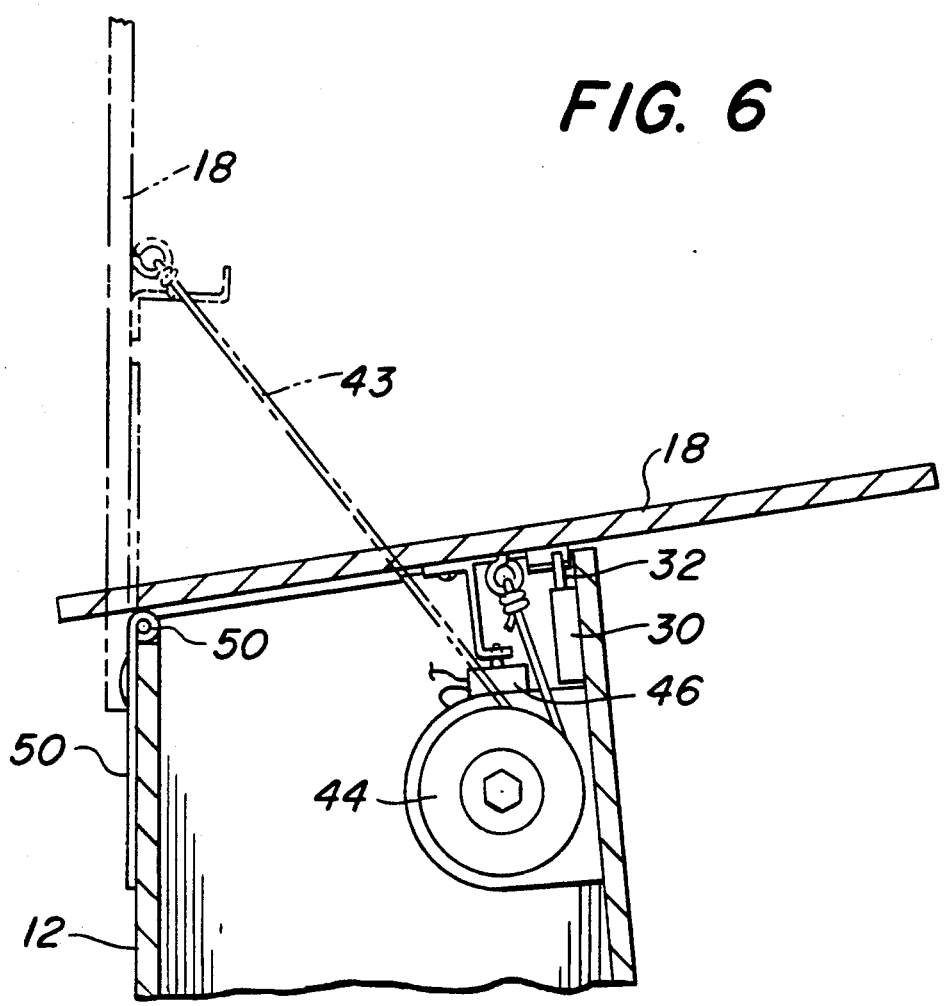
FIG. 6 is a vertical cross sectional view of another embodiment of the interior of a birdfeeder of the invention.
Figure 7:
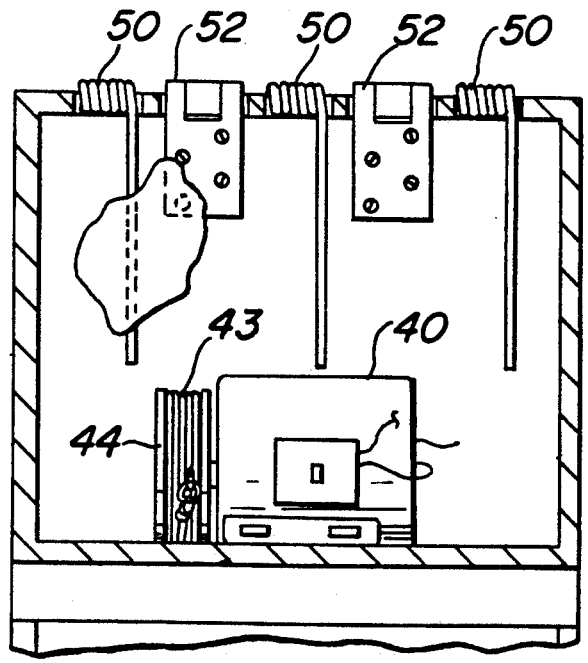
FIG. 7 is a top view of a motorized mechanism useful in the embodiment of FIG. 6.

An alternate embodiment of the birdfeeder of the invention is shown in FIGS. 6 and 7, which provides an embodiment for automated relatching of the roof 18.

A one-way drive clutch motor 40 is actuated when the latch 30 is disengaged by pressure applied to the roof 18. The motor 40 is connected to a power source (not shown) via an electrical connection. A pulley 44 is connected to the roof 18 by line 43 as shown by the dotted lines of FIG. 6. This action disconnects a switch 46, thereby actuating the motor 40, which rewinds the pulley 44 until the latch 30 is reengaged and the roof 18 is closed. When the latch 30 is closed, the switch 46 is contacted by an extending hook 52 which is attached to the roof 18. The motor 40 then shuts off. Thus the motor is only in operation when the roof 18 is in the process of being closed.

FIG. 7 is a schematic top view of the motor 40 with pulley 44 and line 43 in a wound mode. A series of springs 50 and hinges 52 hingedly connect the roof 18 to the housing 12 and urge the roof 18 upwards when the latch is opened.

Various changes and equivalents to the latching means and to the spring loaded piston means will be apparent to one skilled in the art and are meant to be included herein. The exact shape and size of the birdfeeder are not critical, although a larger birdfeeder in general will require variations in the size of the latch or closure means and the size of the springs and pistons needed to fully extend the roof in its open position.

This invention has been described by reference to precise embodiments but it will be appreciated by those skilled in the art that this invention is subject to various modifications and to the extent that those modifications would be obvious to one of ordinary skill they are considered as being within the scope of the appended claims.

What is claimed is:

1. A birdfeeder comprising a housing, a feeding tray extending from said housing and a hinged roof connected to said housing, said hinged roof fitted with latch means that disengages when downward pressure is applied to said roof, and with spring means that urges said roof upward when said latch means is disengaged.

2. A birdfeeder according to claim 1 wherein said roof is attached to said housing and wherein said spring means is a pair of spring loaded pistons wherein the springs in said pistons are in compression when said roof is closed.

3. A birdfeeder according to claim 1 wherein a motor with said housing provides automated closure of said roof after disengagement of said roof from said latch means.

4. A birdfeeder according to claim 3 wherein a pulley is connected to said motor and to said roof.

5. A birdfeeder according to claim 3 wherein said latch means includes a switch means which de-energizes said motor when said latch means contacts said switch.

* * * * *